United States Patent [19]

Bonomo et al.

[11] 4,215,569
[45] Aug. 5, 1980

[54] UNITARY VALVE FOR WATER BRAKE DYNAMOMETER

[75] Inventors: Melvin E. Bonomo, Bloomington; Kenneth M. Coldren; Loren L. Rathbun, both of Colfax, all of Ill.; Ronald D. Towner, Tucson, Ariz.

[73] Assignee: M & W Gear Company, Gibson City, Ill.

[21] Appl. No.: 968,377

[22] Filed: Dec. 11, 1978

[51] Int. Cl.² ............................................. G01L 3/20
[52] U.S. Cl. ..................................... 73/134; 188/290
[58] Field of Search ................. 73/134, 117; 188/290, 188/296

[56] References Cited

U.S. PATENT DOCUMENTS

| | | | |
|---|---|---|---|
| 2,603,968 | 7/1952 | Cline | 73/134 |
| 2,716,339 | 8/1955 | Cline | 73/117 |
| 3,818,754 | 6/1974 | Asmus | 73/134 |

Primary Examiner—Charles A. Ruehl
Attorney, Agent, or Firm—Allegretti, Newitt, Witcoff & McAndrews

[57] ABSTRACT

A water brake dynamometer includes a water brake having a stator housing with a rotor disc mounted on a through shaft. Water from a reservoir is directed into the housing as the shaft and rotor are driven by an external engine. Means are provided to measure the torque transferred from the rotor to the stator housing. An adjustable, unitary valve mechanism controls the rate water is directed into the housing from the reservoir and removed from the housing for return to the reservoir. The valve mechanism includes a single stem having multiple valve members operated by a single hydraulic piston control.

2 Claims, 1 Drawing Figure

UNITARY VALVE FOR WATER BRAKE DYNAMOMETER

BACKGROUND OF THE INVENTION

In a principal aspect, the present invention relates to an improved water brake dynamometer and, more particularly, to a water brake dynamometer having an improved control valve mechanism for controlling water circulation through the water brake.

Heretofore it has been known that dynamometers, including water brake dynamometers, provide an accurate and economical way to test engines. Torque and speed of an engine are measured accurately and precisely by such devices in order to provide a means for adjusting the engine for maximum power output.

In the agricultural field, various types of dynamometers have been suggested including that disclosed in the patent to Ellsworth W. Lapp, et al, U.S. Pat. Nos. 2,981,099, and Melvin Bonomo, 4,062,233. Known dynamometers have proven to be very useful and efficient. However, the advent of improved and more powerful engines for agricultural use necessitates an improved dynamometer.

A type of dynamometer believed to be adaptable for agricultural use is a water brake dynamometer. Water brake dynamometers are generally disclosed in the Society of Automotive Engineers Publication No. 710215 dated Jan. 11-15, 1971 entitled "High Speed Dynamometers—Modern Water Brakes Offer New Potential For Testing Engineers" by W. C. Bronder and Charles S. Jewitt. Dynamometers of this general nature are also disclosed in the patent to Taylor, U.S. Pat. No. 2,035,576 entitled "Dynamometer", issued Mar. 31, 1936, and the patent to Cline, U.S. Pat. No. 2,634,830 entitled "Apparatus and Method for Controlling Dynamometers", issued Apr. 14, 1953.

U.S. Pat. Nos. 2,035,576 and 2,634,830 disclose momentum interaction dynamometers wherein torque is transferred between a rotor and a stator element by means of directed fluid flow between sectors of the rotor and the stator. In the patent issued to Cline, momentum interaction or fluid transfer is effected by means of blade members associated with a rotor directing fluid against cooperative blade members associated with a stator. In the Taylor patent, the rotor and stator are comprised of flat discs having surfaces in opposed relation. Variously sized pie-shaped segments are formed in the surface of the discs. Momentum interaction is effected by transfer of fluid from one of the pie-shaped segments toward a separate pie-shaped segment upon rotation of the rotor with respect to the stator.

The Taylor patent also discloses that water or fluid from a reservoir may be circulated through the water brake to control the operational characteristics of the dynamometer. Hoffstrom, in U.S. Pat. No. 2,551,677, "Hydraulic Brake Actuating Means", further discloses a valve configuration for a fluid brake which controls the circulatory flow of fluid through the fluid brake to and from a reservoir.

While such prior art dynamometers or fluid brakes are believed to function well, a need has remained for a simple unitary control mechanism for controlling and adjusting fluid flow to and from a reservoir through a fluid brake. The present invention constitutes such an improved, unitary control and adjustment mechanism.

SUMMARY OF THE INVENTION

Briefly, the present invention relates to an adjustable, unitary valve mechanism for controlling fluid flow through the water brake of a water brake dynamometer. The dynamometer typically includes a water brake having a stator housing, a rotor mounted on a shaft within the stator housing, means for circulating fluid through the stator housing and means for sensing torque imparted from the rotor to the stator housing. The improved valve mechanism associated with the water brake is designed to adjustably control the circulation of water from a reservoir through the water brake. The valve mechanism includes a unitary housing defining fluid input and output passages. Valve members associated with the passages are mounted on a single, adjustable valve stem controlled by a hydraulic piston attached at one end of the stem. The hydraulic piston is contained within a cylinder attached to the valve housing. The cylinder serves a multiplicity of functions including acting as a bushing and guide for the valve stem and attached valve members.

Thus, it is an object of the present invention to provide an improved water brake dynamometer including a unitary, adjustable valve mechanism for controlling fluid flow through the water brake.

A further object of the present invention is to provide a water brake dynamometer which incorporates a unitary adjustable valve mechanism that simultaneously controls inlet and outlet flow of water to the water brake.

Still another object of the present invention is to provide a unitary adjustable valve mechanism for a water brake which is economical to manufacture, reliable and easy to service.

Still another object of the present invention is to provide a unitary adjustable valve mechanism for a water brake which includes means for biasing the valve member to shut off water supply to the water brake in the event of failure of a control mechanism for the valve mechanism.

These and other objects, advantages and features of the invention will be set forth in the detailed description which follows.

BRIEF DESCRIPTION OF THE DRAWING

In the detailed description which follows reference will be made to the drawing comprised of a single FIGURE including a schematic view of a water brake dynamometer with a cross sectional view of the improved unitary, adjustable valve mechanism incorporated in the dynamometer.

DESCRIPTION OF THE PREFERRED EMBODIMENT

Figure 1:
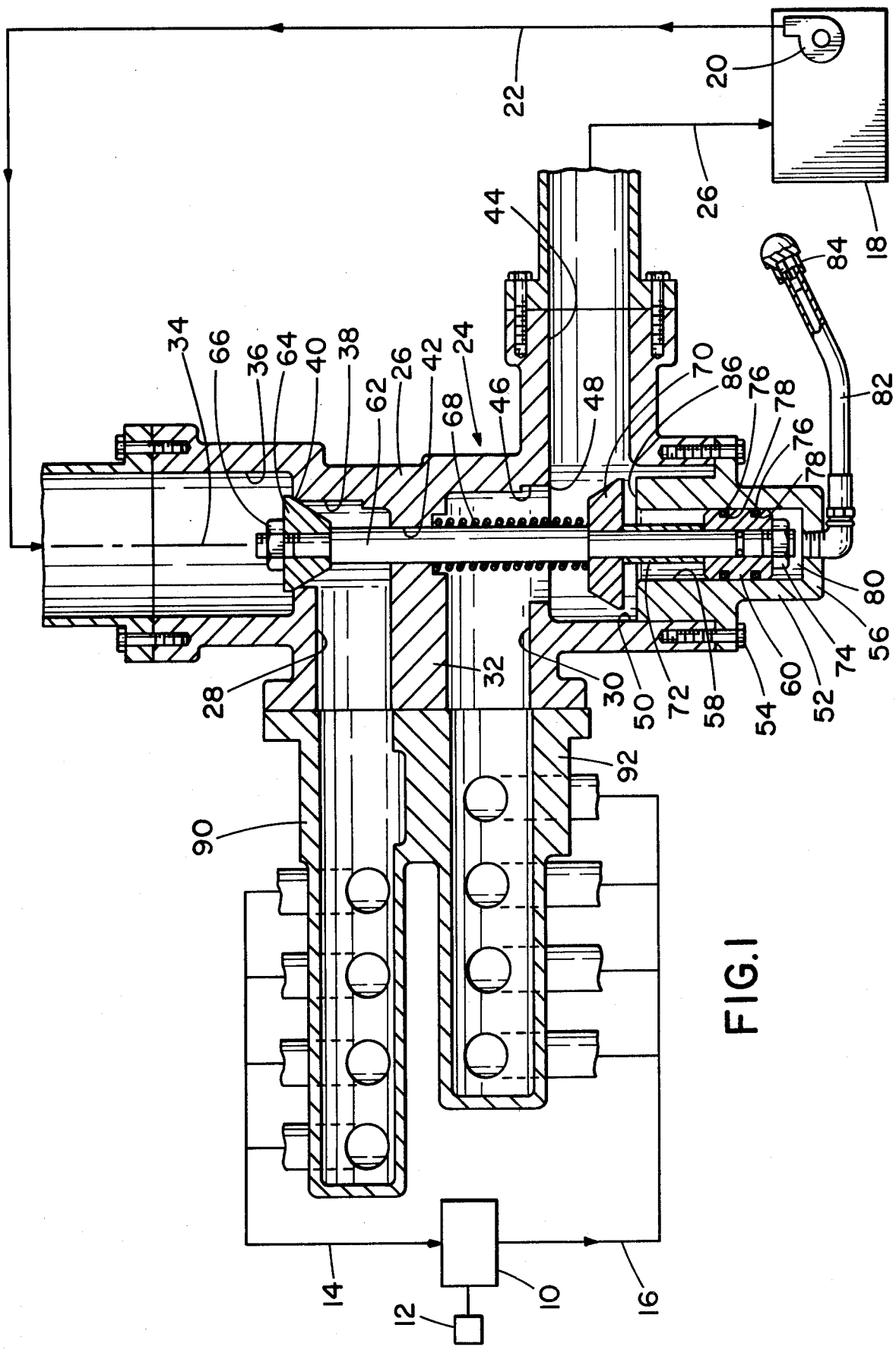

This application is related to a co-pending application entitled "Improved Rotor Stator Configuration For Water Brake Dynamometer", Ser. No. 3,587, filed Jan. 15, 1979, in the name of Bonomo, et al. The cross referenced, co-pending application is incorporated herewith by reference to provide an additional understanding of the general layout of the water brake dynamometer which incorporates the unitary, adjustable valve mechanism described herein. Of course, the valve mechanism as described herein may be incorporated with other types of fluid brake dynamometers. The following description will therefore be set forth with respect to a water brake dynamometer as shown in the cross referenced co-pending application, it being understood that the invention constitutes the combination of the described valve mechanism with a fluid brake dynamometer.

Referring therefore to FIG. 1, a typical dynamometer includes a water brake 10 having torque measuring means 12. A water supply for the water brake 10 is retained in a reservoir 18. A pump 20 discharges water through a discharge line 22. The discharge line 22 directs water into a unitary valve mechanism 24 of the present invention. The water then passes through a line 14 into the water brake 10. Discharge water passes from the water brake 10 through a line 16 into valve mechanism 24 and then by return line 26, back into the reservoir 18. The valve mechanism 24 is a unitary device which controls both inlet flow to and outlet flow from the water brake 10 and thus controls the torque transmission characteristics of the water brake 10.

The valve mechanism 24 includes a main valve housing or body 26 which defines a water inlet channel 28 and a water outlet channel 30, separated by a common wall 32. The inlet and outlet channels 28 and 30 are generally parallel to one another and transverse to a longitudinal axis 34 of the housing or body 26. Coaxial with axis 34 is upstream inlet channel 36 which is connected with inlet channel 28 through a coaxail, circular valve seat opening or passage 38. Passage 38 defines a valve seat 40. Also coaxial with axis 34 is a valve stem bushing passage 42 in common wall 32.

A downstream outlet channel 44 extends transverse to the axis 34 and is offset from channel 30. Thus, a circular outlet passage 46 defining a seat 48 is positioned between channels 30 and 44.

Finally, a control cylinder assembly opening 50 is coaxial with axis 34. Opening 50 receives a control cylinder 52 which is attached by bolts 54 to the housing or body 26. Cylinder 52 includes a head 56 situated at the closed end of an internal cylinder passage 58. A piston 60 slides in passage 58. Piston 60 is attached to the end of a valve stem 62.

The valve stem 62 is inserted through passage 42 and receives a valve member 64 for cooperation with seat 40 at one end. Valve member 64 is retained on stem 62 by bolt 66. A spring 68 is interposed between wall 32 and a second or outlet valve member 70. A spacer ring 72 separates valve member 70 from piston 60 by a fixed distance. All of the component parts are retained by bolt 74 on stem 62. The compression spring 68 normally maintains the valve member 64 tightly against the seat 40.

Seals 76 positioned in circumferential grooves 78 of piston 60 seal the piston 60 against the internal cylinder wall 58. Hydraulic fluid 80 injected into passage 58 by way of control line 82 operates on the head of piston 60 to control the position of stem 62 and the attached valve members 64 and 70 with respect to their respective seats 48 and 40. The seals 76 prevent leakage of the hydraulic fluid 80 into the channels 30 and 44. Fluid pressure in the conduit line 82 is adjusted by means of a manually adjusted fluid pressure mechanism 84. Thereby the piston 60 acts to adjust the setting of the valve members 64 and 70 by providing a force counter to the force of spring 68. Extremely accurate control of the position of valve member 64 and 70 is thereby possible.

Travel of the piston 60 and more particularly the end of the stem 62 is limited toward the head 56 by the valve member 64 which engages the seat 40. The cylinder 52 seals the opening 50. The cylinder passage 58 defines a bushing for the piston 60 to thereby assist in proper alignment of the stem 62 and attached valve members 64 and 70.

As previously described, fluid flow through the unitary valve mechanism 24 is adjusted by means of adjusting the control mechanism 84 which, in turn, controls the position of the piston 60, stem 62 and attached valve members 64 and 70. Fluid flow from channel 36 through passage 38 into channel 28 and thence into manifold 90 is thereby controlled accurately. Returning fluid from line 16 flows into manifold 92, then into channel 30 through passage 46 into channel 44, and finally into the return line 26 leading to reservoir 18 and is likewise controlled accurately and proportionally with respect to inlet fluid flow.

The spring 68 may be changed to thereby alter or adjust the sensitivity of the hydraulic control mechanism 84 for the valve mechanism 24. It is to be noted that the inlet and the outlet flow through passages 38 and 46 are simultaneously and dependently adjustable. It is also noted that the entire assembly is substantially coaxial thereby permitting ease of assembly, disassembly, repair or replacement.

Thus, there are various alternative constructions which incorporate the benefits of the improved valve mechanism of the present invention as combined with a water brake of a dynamometer. Therefore, the invention is to be limited only by the following claims and their equivalents.

What is claimed is:

1. In a dynamometer of the type including:
   a water brake;
   means for supplying fluid to the brake;
   means for receiving fluid from the brake;
   means for sensing torque output from the brake;
   the improvement comprising improved unitary adjustable valve means for simultaneously controlling fluid
   input flow into the water brake and outlet flow from the water brake, said valve means including:
   a valve housing, said housing having inlet and outlet channels defined by an inlet channel wall, an outlet channel wall, and an intermediate common wall separating the channels;
   an inlet valve seat passage and seat in the inlet channel wall;
   an outlet valve seat passage and seat in the outlet channel wall;
   a valve stem passage in the common wall, said seats and passages being co-axial;
   a valve stem in said valve stem passage extending axially through the valve seat passages and including a valve stem projection;
   an inlet valve member fixed to the valve stem cooperative with the inlet valve seat;
   an outlet valve member fixed to the valve stem and cooperative with the outlet valve seat, said stem projecting axially through the outlet valve member, the inlet and outlet valve members being spaced from each other on the stem to permit simultaneous flow through the inlet and outlet passages;
   biasing means for biasing the stem and affixed valve members toward seating of the inlet valve member;
   a piston affixed to the valve stem projection;
   a cylinder housing for receiving the piston, said cylinder housing being attached to the valve housing in alignment with the valve stem whereby the cylinder housing serves as (a) a plug for the valve housing (b) a bushing and guide for the valve stem and (c) a housing for piston controlled movement of the stem; and means for controlling the travel of the piston and thereby the position of the valve members with respect to the inlet and outlet seats.

2. The improvement of claim 1 wherein said biasing means for biasing the stem comprises a compression coil spring on said valve stem interposed between the outlet valve member and the common wall.

* * * * *